LOCKING DEVICE FOR PHONOGRAPH PICKUP ARM

Filed Dec. 2, 1957

2,940,762

LOCKING DEVICE FOR PHONOGRAPH PICKUP ARM

Robert Sydney Spence, St. Margarets, Stanstead Abbots, near Ware, England, assignor to Cosmocord Limited, Waltham Cross, England, a British company Filed Dec. 2, 1957, Ser. No. 700,027

Claims priority, application Great Britain Dec. 4, 1956

3 Claims. (Cl. 274—1)

The present invention relates to gramophones, record players and like devices hereinafter referred to generally as phonographs, and to pickups for use therein.

The invention has for its object the provision of an improved arrangement for locking a pickup arm in its out-of-use position to prevent damage due to accidental displacement, for example, in transit.

In accordance with a feature of the invention there is provided on the deck of the phonograph an apertured rest member and on the pickup arm a rotatable member adapted to engage in the aperture in the rest member and to be locked in engagement therein upon being rotated to a predetermined angular position.

The various features of the invention will be apparent from the following description of one embodiment given by way of example and illustrated in the accompanying drawing.

Figure 1:
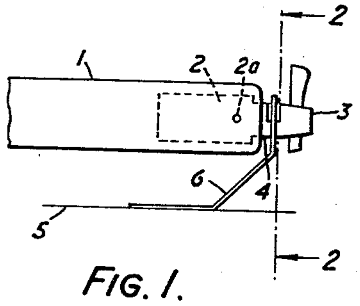
Fig. 1 is a view in side elevation illustrating the improved locking device for a pickup arm.

A pickup arm of which the end portion 1 is shown in Figure 1 is provided with a recess adapted to receive a multi-stylus cartridge indicated schematically by the dotted line rectangle 2 which when inserted in the recess can be rotated to bring any one of its styli 2*a* into operative position. The different styli are respectively suited to different playing speeds, and rotation of the cartridge is effected by means of a control knob 3 on a shaft 4 which projects from the free end of the pickup arm when the cartridge is in position in the recess as shown.

On the deck indicated at 5 of the phonograph there is provided an apertured rest member 6 positioned clear of the turntable and so as to receive and support the control shaft of the cartridge and thus support the pickup arm 1 when it is in its out-of-use position.

In order to provide for locking of the pickup arm 1 in the aperture 7 (Figure 3) in the rest member 6 the shape, in section, of the control shaft 4 and the shape of the aperture 7 are arranged to be such that in most rotational positions of the shaft it can freely be entered into and withdrawn from the aperture but upon being entered and then rotated to or through a predetermined angular position or positions the shaft is locked against withdrawal. This is achieved by so shaping the shaft that it has, in section, two appreciably different dimensions, and by so shaping the aperture that it has a neck portion through which the smaller dimension can freely pass but through which the larger dimension cannot pass. Beyond the neck portion the aperture widens sufficiently to allow free rotation of the shaft after it has passed through the neck portion.

Figure 2:
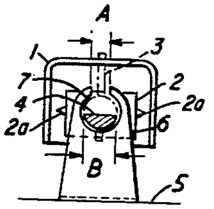
Fig. 2 is a view in vertical transverse section taken on line 2—2 of Fig. 1.
Figure 3:
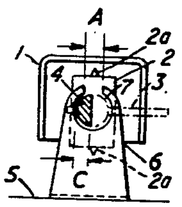
Fig. 3 is a view similar to Fig. 2 but showing the pickup arm rotated 90° to an unlocked position.

This relationship of dimensions is apparent from Figures 2 and 3 which are sections along the chain dotted line of Figure 1 looking in the direction of the arrows and respectively show the shaft in the locked and unlocked positions thereof.

In Figure 2 the dimension B is larger than the dimension A so that the shaft 4 is prevented from escaping from the aperture 7. In Figure 3 the dimension C being less than the dimension A the shaft can be withdrawn from the aperture.

Thus upon entering the shaft into the aperture and then rotating the shaft to the rotational position in which it presents its larger dimension to the neck of the aperture 7 the shaft becomes locked in the aperture and accidental displacement of the pickup arm is prevented.

Conveniently the rotational position in which the shaft is so locked corresponds to that in which none of the styli 2*a* of the cartridge 2 is positioned for operation and preferably in which all the styli are wholly within the recess in the pickup arm 1, as is evident from Fig. 2, and are thus further protected from damage.

It will be apparent that with pickup arms not employing rotatable stylus cartridges a rotatable shaft of suitable section could be provided on the arm specifically for the purpose of locking the arm in its out-of-use position. Moreover a variety of co-acting shapes of shaft and aperture can readily be foreseen which will produce the required locking function.

I claim:

1. A phonograph including a pickup having a recess therein forming a housing for a stylus cartridge, a multi-stylus cartridge rotatably received in said housing, said cartridge being rotatable in said housing to bring each of its styli into playing position at a different angular position of said cartridge, and a rest member for supporting said pickup arm in out-of-use position, said rest member being formed with an aperture having a restricted opening in one edge of said member and said cartridge having a part thereof so dimensioned that when said cartridge is in any one of the angular positions in which a stylus is in playing position said part can be freely entered into and withdrawn from said aperture through said restricted opening but in at least one predetermined other angular position thereof it cannot be withdrawn from said aperture, said aperture being sufficient in size to permit rotation of said part within said aperture.

2. A phonograph as set forth in claim 1 in which said cartridge is rotatable into and out of a "safe" angular position in which all of its styli lie within said housing, said safe angular position coinciding with said predetermined other angular position.

3. A phonograph including a pickup arm having a recess therein forming a housing for a stylus cartridge, a multi-stylus cartridge rotatably received in said housing, said cartridge having a shaft on which an operating knob is mounted and being rotatable from a "safe" angular position in which all of its styli lie within said housing through each of a plurality of "playing" angular positions in which each of said styli in turn is positioned for co-operation with a phonograph record by rotation of said shaft by means of said knob, and a rest member for supporting said pickup arm in out-of-use positions, said rest member having an aperture therein which has a restricted opening in one edge of said member, and said shaft having, at least over part of its length, a section such that when said cartridge is rotated to any one of its playing angular positions said shaft can freely enter and be withdrawn from said aperture through said opening, and when said cartridge is rotated to said safe angular position said shaft cannot enter or be withdrawn from said aperture, said aperture being of sufficient size beyond said restricted opening to permit rotation of said shaft within said aperture.

References Cited in the file of this patent

UNITED STATES PATENTS

| | | |
|---|---|---|
| 1,487,387 | Hurlbutt | Mar. 18, 1924 |
| 1,915,906 | Thomas | June 27, 1933 |
| 2,601,126 | Palo et al. | June 17, 1952 |